United States Patent

[11] 3,601,064

| [72] | Inventors | Simon S. Jackel<br>Westport, Conn.;<br>Kenneth R. Rand, Short Hills, N.J.; Fred T. Letterman, Allendale, N.J.; Volodymyr R. Diachuk, Rutherford, N.J. |
|---|---|---|
| [21] | Appl. No. | 824,884 |
| [22] | Filed | May 15, 1969 |
| [45] | Patented | Aug. 24, 1971 |
| [73] | Assignee | Baker Research Development Services Inc.<br>New York, N.Y. |

[54] METHOD OF PREPARING DOUGH
9 Claims, 3 Drawing Figs.

[52] U.S. Cl. .................................................. 107/54 B,
99/90 R
[51] Int. Cl. .................................................. A21d 8/02
[50] Field of Search .......................................... 107/30,
54.2, 54.28, 57.3; 99/90, 91

[56] References Cited
UNITED STATES PATENTS

| 2,255,282 | 9/1941 | Duffy et al. ............... | 107/54 |
| 3,429,712 | 2/1969 | Turner ....................... | 99/90 |
| 3,494,770 | 2/1970 | Smerak ...................... | 99/90 |

*Primary Examiner*—Louis K. Rimrodt
*Attorney*—Larson, Taylor & Hinds

ABSTRACT: A continuous method of preparing dough including a premixing step and a development step. Prior to development, the premixed dough is rested for at least 10 minutes. The requirement for setting the broth can be entirely eliminated if a relatively long rest period is employed.

Patented Aug. 24, 1971

INVENTORS
SIMON S. JACKEL
KENNETH R. RAND
FRED T. LETTERMAN
VOLODYMYR R. DIACHUK

BY *Larson and Taylor*

ATTORNEYS

METHOD OF PREPARING DOUGH

BACKGROUND OF THE INVENTION

The present invention relates to the preparation of dough. More particularly, the invention relates to an improvement in a continuous method of making dough which involves a premixing step and a development step which method has been come to be known as the "continuous mix" method of preparing dough as distinct from the "sponge dough" and "straight dough" methods. These methods are particularly suited to the preparation of bread dough.

In the sponge dough process, a portion of the ingredients is mixed with water to form the sponge. After fermentation, the sponge is returned to the mixer for incorporation of the remaining portion of the ingredients to form the dough. The dough is then fermented and subsequently divided, rounded, proofed and baked to form, for example, bread. In the straight dough process, only one mixing and fermenting process is involved.

In the continuous mix process, as described for example in U.S. Pat. No. 2,953,460, a liquid ferment is set containing the yeast and yeast nutrients in order to obtain active fermentation and to develop flavor. The liquid ferment, or broth, is metered into a premixing zone of a mixing machine along with the flour and other dough ingredients. The ingredients are incorporated in this premixing zone which is open to the atmosphere without substantial development of the dough. The premixed dough is then introduced into a closed developing zone where the dough is subjected to strong mixing action until the gluten structure loses a good deal of its elastic properties. The dough becomes fully developed and has greater gas-cell retention properties than in the premixed condition.

While the continuous mix method has found wide commercial acceptance, bread produced by the process has characteristics of mouth feel, toasting and the like, which are quite different from conventional sponge dough or straight dough bread. The mixing requirement of development is quite heavy and, as a result, the temperature of the developed dough is relatively high unless cooling is employed which, in turn, increases the mixing requirement. In addition, it is necessary to set the ferment for a period of about 2½ hours. Accordingly, it is an object of the present invention to provide an improvement in the continuous mix process of making bread. It is a further object to reduce the mixing requirements of development to easily provide a cooler developed dough if desired. It is still a further object of the invention to reduce, or eliminate entirely, the broth used in making continuous mix bread.

BRIEF SUMMARY OF THE INVENTION

The foregoing and other objects which will be apparent, are achieved according to the invention by resting the premixed dough prior to developing for a period of at least 10 minutes.

DESCRIPTION OF THE PREFERRED EMBODIMENTS

Figure 1:
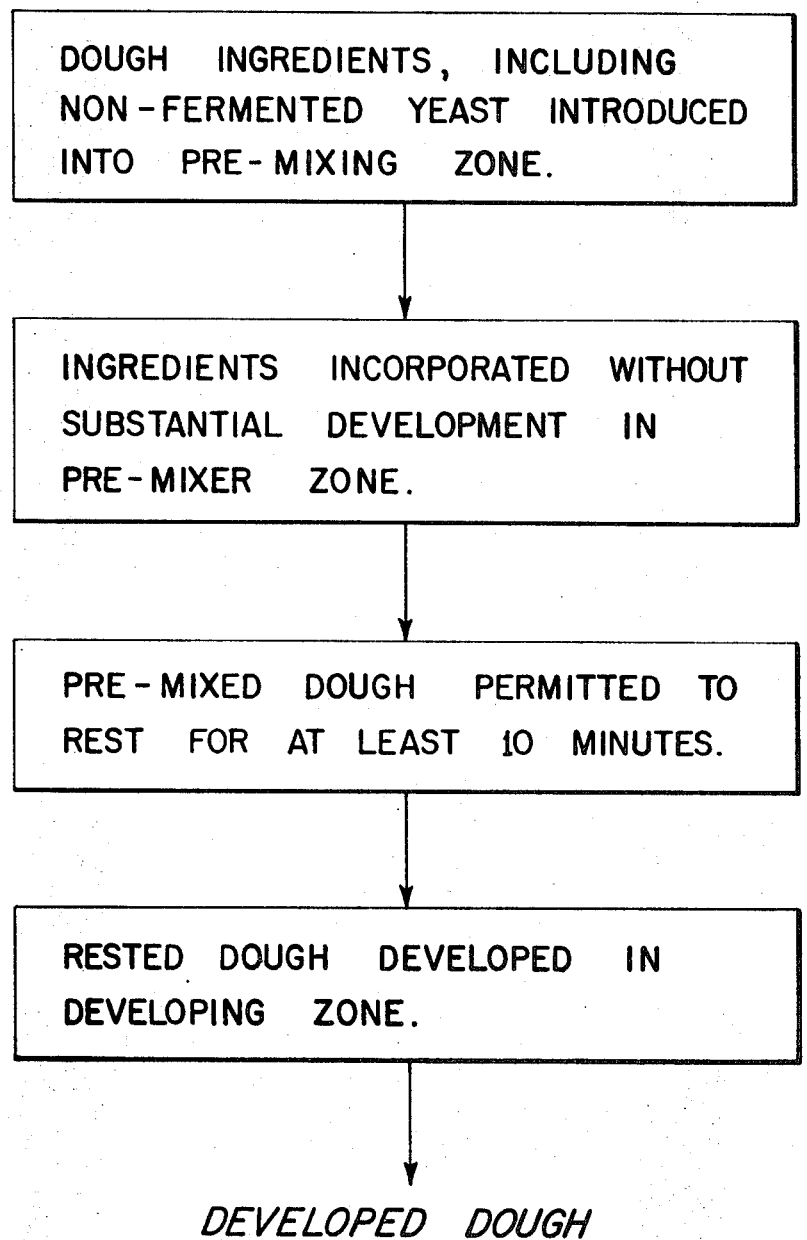
FIG. 1 is a flow sheet showing the individual process steps of an embodiment of the invention.

The process involved in the present invention is a continuous dough making process which involves a premixing step and a subsequent development which perform the same function as in the conventional continuous mix dough making process described, for example, in U.S. Pat. No. 2,953,460. As is more fully disclosed in that process, the dough ingredients, including a set liquid ferment or broth, are incorporated by mixing in an open premixing zone to mix the dough ingredients without causing any substantial development. The premixed dough is then introduced into a closed mixing zone and subjected to vigorous mixing action to develop the dough to improve its gas-cell retention properties. The present process is conveniently carried out in conventional continuous mix apparatus including an open premixing chamber and a closed development chamber fully described in U.S. Pat. No. 2,953,460 modified only to the extent necessary to permit removal of the premixed dough from the machine prior to development. The disclosure, including the drawings, of U.S. Pat. No. 2,953,460 is hereby incorporated by reference as a disclosure of suitable premixing and developing equipment.

The ingredients of the dough are conventional and include flour, water, shortening, sugar, salt, yeast, yeast foot, buffers, oxidation and other conventional ingredients in conventional amounts to produce dough suitable for various baked products such as bread. According to one embodiment of the invention, the requirement for a broth is dispensed with and the yeast is thus added in a nonfermented state.

In another embodiment, less broth than usual can be used and additional, nonfermented yeast added. In another embodiment, a partially set ferment can be used, either with or without the addition of nonfermented yeast. In another embodiment, a chemical developing agent is included in the premixed dough. In all of these embodiments, however, the ingredients are conventional in the dough making process and the process may be carried out in conventional dough making equipment. Thus the invention does not involve the use of any new chemicals or apparatus. Rather, the invention involves new processing and formulation techniques.

The following examples illustrate the invention.

EXAMPLES 1-3

A bread dough is made from the following formulation:

| Ingredient | Amount | |
|---|---|---|
| | (% weight based on weight of flour) | (gm.) |
| Flour | 100.0 | 5,200 |
| Water | 67.0 | 3,422 |
| Sugar | 8.0 | 416 |
| Salt | 2.25 | 117 |
| Calcium propionate | 0.1 | 5.2 |
| Calcium acid phosphate | 0.1 | 5.2 |
| Yeast food | 0.5 | 26.0 |
| Yeast | 2.5 | 130.0 |
| Shortening blend | 3.0 | 156.0 |

The ingredients are premixed in a Hobart mixer until the ingredients are incorporated but without causing any substantial development. The premixed dough is divided into three portions. A first portion of the premixed dough is rapidly transferred to the developing zone of a conventional "Do Maker" laboratory unit and developed. The developed dough is proofed and baked to form bread of very poor quality. A second portion of the premixed dough is permitted to rest for 30 minutes and, after gentle mixing to degas the dough, is developed and made into bread as above. A third portion is made into bread as with the second portion, but is subjected to a 45 minute rest period rather than a 30 minute rest period. The results are shown in table I, the proof times being the optimum for each example as determined by repeated runs.

TABLE I

| EX. | Developer Mixing Speed (r.p.m.) | Final Dough Temperature (°F.) | Proof Time (min.) | Volume/ Weight Ratio (gm./ml.) | Bread Quality |
|---|---|---|---|---|---|
| 1 | 210 | 108 | 75 | 5.25 | Very poor |
| 2 | 210 | 108 | 64 | 5.31 | Fair-poor |
| 3 | 210 | 106 | 61 | 4.79 | Fair |

The results show that, where no broth is used, permitting the premixed dough to rest prior to development causes a significant improvement in bread quality.

The examples which follow illustrate how the bread quality can be further improved according to the invention.

EXAMPLES 4-6

Bread dough is formulated as in examples 1-3 except that a chemical dough developer is included in the formulation in the amount of 1 percent by weight, based on the weight of the flour. The developer in this case is L-cysteine, marketed as CM-28. Bread is made exactly as in examples 1-3 with rest periods between premixing and development of 0, 30 and 45 minutes and the results are shown in table II.

TABLE II

| EX. | Developer mixing Speed (r.p.m.) | Final Dough Temperature (°F.) | Proof Time (min.) | Volume/ Weight Ratio (gm./ml.) | Bread Quality |
|---|---|---|---|---|---|
| 4 | 150 | 102 | 75 | 5.72 | Very poor |
| 5 | 150 | 103 | 60 | 5.17 | Fair |
| 6 | 150 | 100 | 55 | 5.00 | Fair-Good |

These results show improvement in quality of the bread by the incorporation of a chemical dough developer where the premixed dough, formulated without broth, is permitted to rest prior to development. The mixing requirement to produce developed dough is substantially reduced and the final dough temperature is therefore lowered. Incorporation of greater amounts of the chemical dough developer improves the process as shown in the following examples.

EXAMPLES 7-9

A process as in examples 4-6 is followed except that 2 percent of CM-28 is incorporated in the formulation and the rest periods are 30, 45, and 60 minutes. The results are shown in table III.

TABLE III

| EX. | Mixing Speed (r.p.m.) | Final Dough Temperature (°F.) | Proof Time (min.) | Volume/ Weight Ratio (gm./ml.) | Bread Quality |
|---|---|---|---|---|---|
| 7 | 100 | 93 | 62 | 5.00 | Good |
| 8 | 100 | 93 | 59 | 4.84 | Very good |
| 9 | 100 | 93 | 56 | 4.95 | Very good |

The bread produced by this process has a quality of commercial bread made by conventional sponge dough and continuous mix processes. The grain is slightly more open than conventional continuous mix bread, is more firm, and has better sidewall strength. In short, the bread has the best characteristics of both continuous mix bread and sponge-dough bread.

While the foregoing examples illustrate a convenient method of carrying out the invention, it will be understood that the invention can be carried out in several other ways. For example, a broth may be prepared and incorporated into the premixer in the usual manner and the development requirement will be reduced. Alternatively, a conventional broth may be used in less than conventional amount and in this case, the broth can be supplemented by a chemical developer if it is desired to reduce the developing requirement. In any event, irrespective of whether the broth is reduced or eliminated, a chemical dough developer can be added to the dough formulation. While some dough developers have been found to be more effective than others, all of the known developers tested, such as ascorbic acid, have been found effective in the present invention. Some developers, such as ascorbic acid, may be provided in the flour prior to use. At least one such modified flour ("AAT" flour, International Milling Co.) is commercially available. The developer is utilized in an amount effective to substantially reduce the developing requirement and this, in turn, will depend upon other factors such as the presence or absence of broth in the premix and the length of the rest period. Still another alternative involves activating the yeast prior to incorporation into the premixer and this is readily accomplished by activating the yeast in an aqueous sugar solution of the appropriate pH and containing conventional yeast food.

As an alternative to a chemical developer, or in addition thereto, it is possible to reduce developer requirements by using fat-coated salt to satisfy some or all of the salt requirement of the formulation. The fat coating restrains the hardening effect of salt on the flour gluten thereby reducing the mixing requirement. The fat preferably has a relatively high melting point and the coating preferably includes a conventional bakery emulsifier. The fat-coated salt may be obtained by conventional coating or encapsulating techniques and at least one product ("Xalt") is available commercially.

The dough making process can also include conventional variations in the continuous mix process such as the incorporation of flour into the broth where broth is used, or the use of fermentation of a small amount of the dough prior to incorporation into the premixer as described, for example, in U.S. Pat. No. 2,953,460.

The optimum duration of the rest period will, of course, vary with the formulation and the techniques used as shown in the examples. In general, however, substantially no improvement is achieved unless the dough is relaxed for at least 10 minutes. A longer rest period, of from 20 minutes to 60 minutes is generally preferred. Longer periods usually do not improve the dough and since a short processing time is desirable, it would not usually be desirable to increase the rest period beyond about 4 hours.

Figure 2:
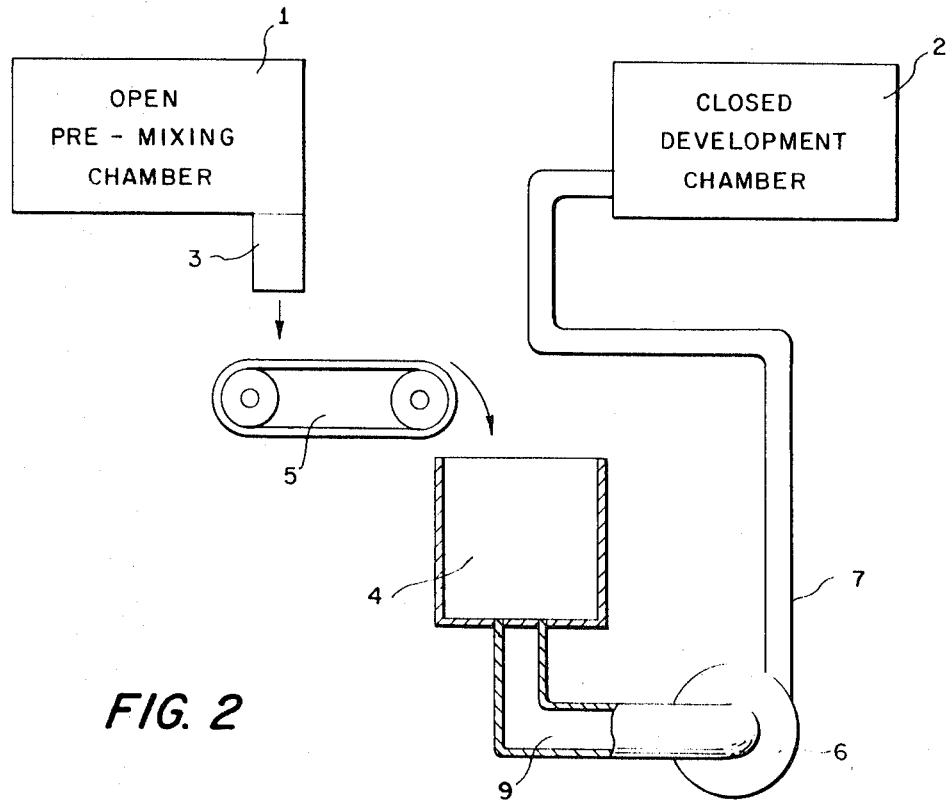
FIG. 2 is a diagrammatic illustration of apparatus useful to carry out the process of FIG. 1.
Figure 3:
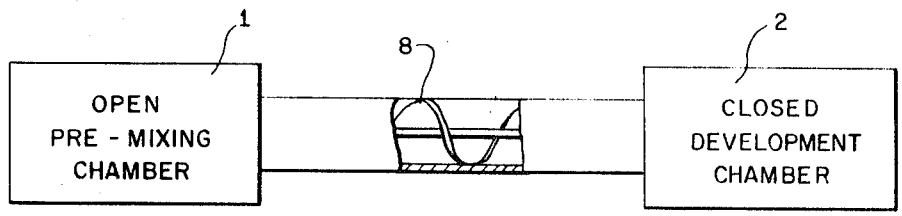
FIG. 3 is a diagrammatic illustration of alternative apparatus useful to carry out the process of FIG. 2.

The invention may be carried out in conventional premixing equipment and conventional developing equipment as shown in FIGS. 2 and 3. Conventional continuous mix apparatus shown generally in FIG. 2 and more fully in U.S. Pat. No. 2,953,460, includes an open premixing chamber 1 including mixing means (not shown) to incorporate the dough without developing same, and a closed developing chamber 2 including mixing means (not shown) to develop the premixed dough. The apparatus disclosed in U.S. Pat. No. 2,953,460 includes conduit means permitting the premixed dough to be admitted into the developing zone and a pump is usually employed in the conduit for this purpose.

According to the present invention, premixed dough is discharged from the premixing chamber through a suitable discharge port 3 and permitted to rest in a rest zone free of substantial mixing action. In the embodiment shown in FIG. 2, the rest zone is a hopper tank 4 into which the premixed dough is introduced at the top. The dough can be fed directly to the tank or a suitable conveyor 5 may be used as shown. Dough is delivered from the tank 4 to the development chamber 2 by means of conduit 9, pump 6, and conduit 7. The dough may be returned periodically or, if continuous operation is required, tank 4 is sized to provide a desired hold time during continuous operation. Alternatively, continuous operation can be achieved, in effect, by providing two or more tanks which are operated sequentially. In a typical commercial size operation, tank 4 is large enough to hold 7,000 pounds of dough which is sufficient to provide flexibility for a hold time of up to 60 minutes.

The process can also be run continuously in apparatus shown in FIG. 3 by conveying the premixed dough from the premixing chamber to the development chamber by a screw conveyor 8 designed to have a hold time corresponding to the desired rest period. For example, assuming a production rate of 7,500 pounds of dough per hour and a rest period of 45 minutes, the conveyor capacity would be 5,625 pounds of dough. Assuming a density of 30 lbs./ft.$^3$, a conveyor capacity of 187 ft.$^3$ is required which would be met by a tunnel of 4 feet in diameter, 15 to 20 feet long, equipped with an auger. Alternatively, a simple conveyor belt equipped with a doctor blade to feed the dough to the developer zone could be used. The premixed dough is preferably degassed prior to development and this may be done manually after or during the rest period or it may be accomplished in the normal handling of the dough during the rest period. Alternatively, a beater or folder or other degassing device may be utilized and positioned to degas the dough prior to entry to the developer chamber.

As mentioned above, bread produced by the present invention combines the advantages of bread made by the continuous mix process and by the sponge-dough process. The invention also permits a reduction in development requirement and permits reduction or elimination of the liquid ferment.

What we claim is:

1. In a method of making dough by a continuous process wherein all of the bread dough ingredients are mixed in a premixing zone without substantial development to form a premixed dough and the premixed dough is continuously developed in a closed developing zone to provide developed dough having greater gas cell retention properties than in the premixed dough, the improvement which comprises subjecting the premixed dough, prior to development thereof, to a rest period of at least 10 minutes.

2. A method according to claim 1 wherein the bread ingredients introduced include yeast which is not previously fermented.

3. A method according to claim 2 wherein the premixed dough is permitted to rest for a period of at least 30 minutes.

4. A method according to claim 2 wherein a chemical dough developer is incorporated into the premixed dough in the premixing zone.

5. A method according to claim 4 wherein said chemical dough developer comprises cysteine.

6. A method according to claim 1 wherein the bread dough ingredients include flour and fat-coated salt, said fat restraining the hardening effect of salt on the flour gluten.

7. A method according to claim 1 wherein the rested premixed dough is degassed prior to development.

8. A method according to claim 1 wherein the premixed dough is rested from 10 minutes to 4 hours.

9. A method according to claim 1 wherein the dough ingredients include flour, said flour being premixed with ascorbic acid in an amount sufficient to provide chemical dough development.